L. KUBALLO.
CLOSET SEAT SCREEN.
APPLICATION FILED NOV. 25, 1919.

1,366,695.

Patented Jan. 25, 1921.
2 SHEETS—SHEET 1.

Inventor.
Leo Kuballo.
by
his Atty.

L. KUBALLO.
CLOSET SEAT SCREEN.
APPLICATION FILED NOV. 25, 1919.

1,366,695.

Patented Jan. 25, 1921.
2 SHEETS—SHEET 2.

Inventor:
Leo Kuballo.

by Fred P. Foree
his

UNITED STATES PATENT OFFICE.

LEOPOLD KUBALLO, OF SEATTLE, WASHINGTON.

CLOSET-SEAT SCREEN.

1,366,695.

Specification of Letters Patent.

Patented Jan. 25, 1921.

Application filed November 25, 1919. Serial No. 340,438.

*To all whom it may concern:*

Be it known that I, LEOPOLD KUBALLO, a citizen of the United States, residing at 4019 47th St. S. W., Seattle, in the county of King and State of Washington, have invented certain new and useful Improvements in Closet-Seat Screens, of which the following is a specification.

This invention relates to an improvement in protecting means for closet bowls, wherein provision is made for safe-guarding the bowl against the introduction thereinto of matter tending to choke or clog the outlet.

The invention comprises particularly a screen member made up in two parts, with each part constructed of relatively movable or hinged sections. The respective parts of the screen member are mounted to be actuated by levers, automatically moved to a position to draw the members into screen forming relation to thereby dispose the screen across the bowl to protect the same, the said levers being also for movement under pressure on the seat to open the members with relation to each other, and hold them against the sides of the bowl, to thereby remove the screen from interruption to the ordinary uses of the bowl.

Figure 1:
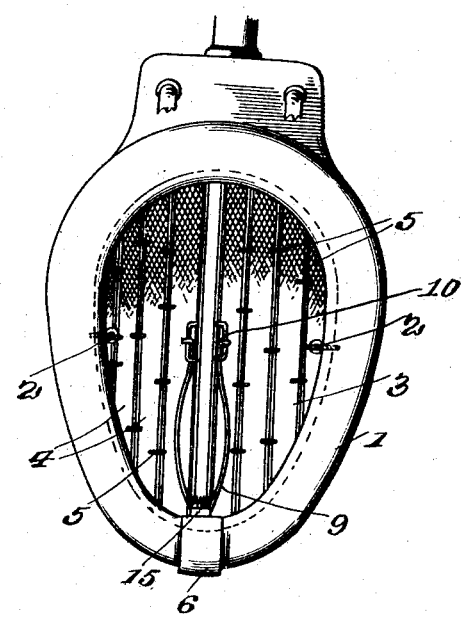
Figure 1 is a plan view illustrating the application of the improved screen protective means.
Figure 2:
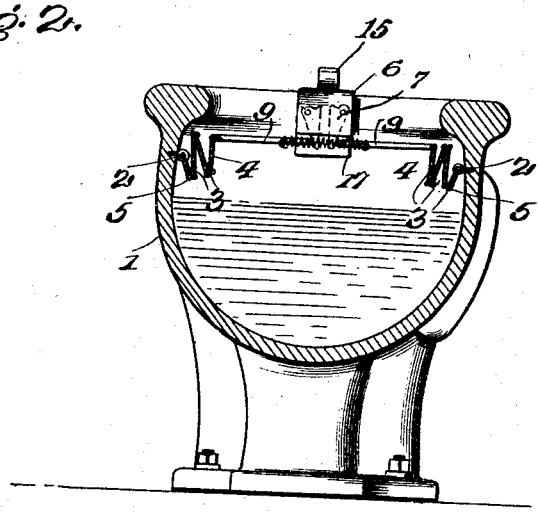
Fig. 2 is a vertical central section of the same, the screen being shown open or in folded relation.
Figure 3:
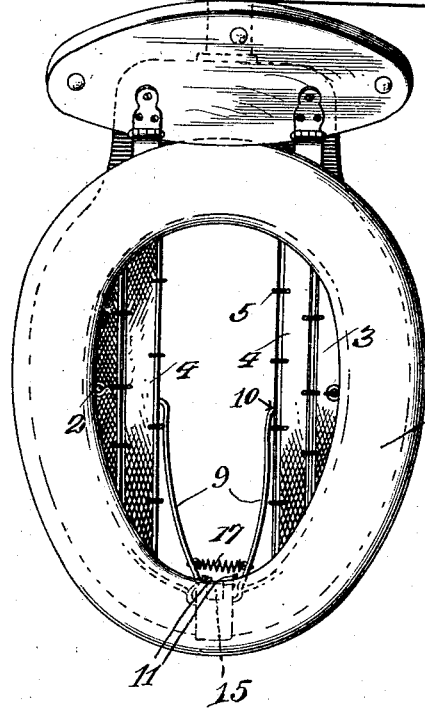
Fig. 3 is a plan of the bowl with the screen shown partially open.
Figure 4:
Fig. 4 is an enlarged elevation showing in detail the means for starting the screen sections under application of weight to the seat.
Figure 5:
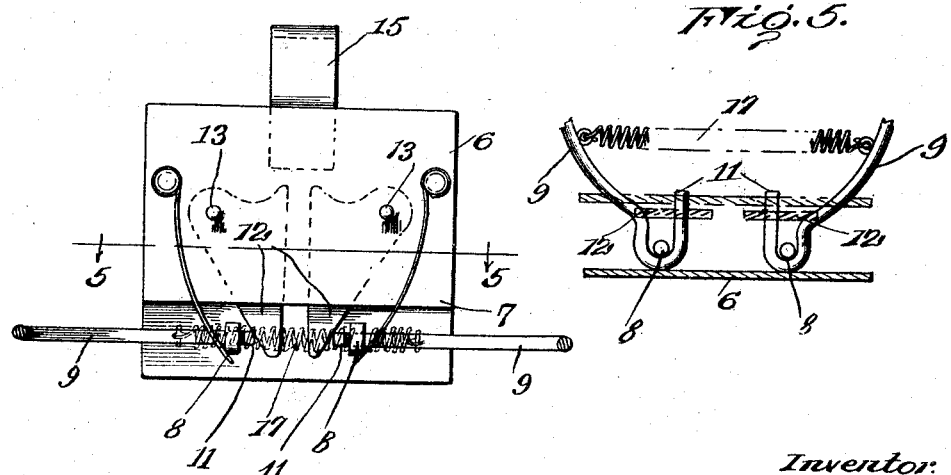
Fig. 5 is a section on line 5—5 of Fig. 4.

Of the accompanying drawings, the bowl 1, which may be in any usual or preferred type, is provided at diametrically opposite points with supports 2, preferably in the form of eye members. Secured to the respective supports are screen members 3, of identical form and each constructed of relatively narrow sections 4, hingedly connected one with another, as for example, by the ring loops 5. Each screen member is of a size co-extensive with one-half the interior sectional area of the bowl at the point where the screen is to be applied, so that with the sections arranged in full operative position, as shown in Fig. 1, a complete screen will be arranged across the bowl, below the open end thereof, to effectively guard against the introduction of matter tending to clog the bowl or interfere with the free flushing thereof.

Secured on the forward edge of the bowl is a clip 6, having an inner plate 7 depending within the bowl. Pivotally mounted on studs 8, carried by the clip 6, are screen member operating levers 9. These levers are mounted for movement in a horizontal plane, and their forward ends are connected to the relatively inner edges of the respective screen members, as at 10. The opposite ends of the levers 9 are projected inwardly in the bowl beyond the pivot studs 8 in the form of short arms 11. Mounted upon the plate 7 are actuating dogs 12, here shown as of approximately triangular form, arranged in the same plane, pivotally supported at their relatively remote upper corner portions as 13. The lower ends of the dogs are free and disposed inwardly of the pivots 13, and rest between the inner arms 11 of the operating levers 9. The inner upper edges of the dogs 12 rest in line with a plunger 15, movably mounted in the clip 6, and adapted to be engaged by the usual seat 16, when the latter is in operative position on the bowl.

The dogs 12 thus act in effect as eccentrically mounted members adapted under depression of the plunger 15 to have their lower free ends swung laterally and oppositely to thereby engage the arms 11 of the levers 9, to compel a spreading movement of the operative ends of said levers, to force the screen members apart. A spring 17 connects the levers 9 to oppose the spreading movement thereof under action of the plunger 15, so that upon release of pressure of said plunger, the spring acts to return the levers to operative position and thereby move the screen members into closed relation with the bowl.

It is of course understood that the normal weight of the seat 16 is not sufficient to actuate the levers against the force of the spring 17, but that when said seat is in use, the additional weight will carry out the function stated.

In the operative movement of the screen members, the respective sections thereof, will, owing to their hinged connection, move one upon another, so that the screen member gradually folds until in final position it is folded against the adjacent sides of the bowl entirely out of the way.

What I claim is:

1. A screen protector for closet bowls, constructed in separable members, each member being composed of a plurality of hinged sections adapted to fold one upon the other, means for folding the members at opposite sides of the bowl to clear the bowl under pressure of the seat, and means for automatically returning the members to bowl screening position, upon release of such seat pressure.

2. A bowl screen made up of two members movably connected with the bowl, and each constructed of hingedly connected sections, levers connected to the meeting edges of the members, and supported on the bowl, a spring for normally maintaining said levers in position to hold the members in bowl screening relation, and means operative under the seat pressure to actuate said levers to collapse the respective members through folding of their sections.

3. The combination of a closet bowl and a collapsible screen therefor composed of hingedly connected sections adapted to fold one upon the other, lever means for moving said screen to and from said position, means for automatically drawing said lever means, to move the screen into bowl screening position, and means actuated by the pressure of the seat to actuate the lever means to collapse the screen.

4. A closet bowl screen made up of separate members composed of a plurality of link connected sections adapted to fold one upon the other, levers pivotally mounted on the bowl and connected to said members, springs for holding the levers in a predetermined normal relation, dogs to engage the levers and spread the same against the action of the spring, and a seat operated plunger to move the dogs.

5. A closet bowl screen comprising separable sections composed of hingedly connected strips, having one edge of each section hinged to the bowl, a clip mounted on the bowl, a pair of levers pivoted to the clip and one secured to the other edge of each screen, resilient means normally holding the levers together and the screen in closed or bowl covering position, dogs pivoted in the clip for operating the levers and means for operating the dogs to open the screen folding the sections one upon the other.

6. A closet bowl screen comprising a pair of bowl covering members formed of link connected strips adapted to fold one upon the other, and at opposite sides of the bowl, said members being hingedly connected with the bowl at opposite sides, a clip mounted on the bowl, levers pivotally mounted on the clip, each having an arm connected with one of said covering members and also having short arms formed thereon, a pair of dogs pivotally mounted in the clip and each one being adapted to engage one of said short arms, a plunger for moving said dogs, and resilient means for normally holding said covering members in extended position, whereby when the plunger is moved to actuate the dogs, the levers will be rotated about their pivots by the dogs and fold the strips of said covering members one upon the other at opposite sides of the bowl.

In testimony whereof I affix my signature.

LEOPOLD KUBALLO.